United States Patent [19]

Isshiki

[11] Patent Number: 4,918,464

[45] Date of Patent: Apr. 17, 1990

[54] HEAT-SENSITIVE IMAGE TRANSFER TYPE PRINTING APPARATUS

[75] Inventor: Makoto Isshiki, Ichikawa, Japan

[73] Assignee: Dai Nippon Insatu Kabushiki Kaisha, Japan

[21] Appl. No.: 276,133

[22] Filed: Nov. 25, 1988

[51] Int. Cl.[4] .............................................. G01D 15/10

[52] U.S. Cl. ................................ 346/76 PH; 346/34; 400/120

[58] Field of Search .................. 346/76 PH, 134, 145; 400/120 PH; 355/3 SH; 361/221

[56] References Cited

U.S. PATENT DOCUMENTS 4,494,166 1/1985 Billings et al. ...................... 361/221

4,614,949 9/1986 Hakkaru et al. .................... 346/145

FOREIGN PATENT DOCUMENTS 0030556 2/1984 Japan ................................ 355/3 SH

*Primary Examiner*—Bruce A. Reynolds

*Assistant Examiner*—Huan Tran

*Attorney, Agent, or Firm*—Arnold, White & Durkee

[57] ABSTRACT

A transfer ink film having one major surface containing sublimable dyes is passed through a path between the surface of a drum and a thermal head having a plurality of heating elements which are selectively energized in response to input image signal, while a record sheet is fed from a record-sheet feed part of a printing apparatus to said path so as to be superposed on the transfer ink film. As a result, the dyes are transferred by sublimation from the transfer ink film to the superposed record sheet. During the feed of the record sheet, any dust particles or the like attached to the surface of the sheet are removed by an adhesive roller, an electric discharge brush and so on whereby a high-quality image can be obtained on the record sheet. The record sheets are contained in the form of a stack in a sealed cassette which is detachably inserted into the record-sheet feed part of the printing apparatus.

8 Claims, 5 Drawing Sheets

HEAT-SENSITIVE IMAGE TRANSFER TYPE PRINTING APPARATUS

BACKGROUND OF THE INVENTION

The present invention relates to heat-sensitive image transfer type printing apparatuses and more particularly to a heat-sensitive image transfer type printing apparatus best adapted to record high-quality colored images.

Conventional heat-sensitive image transfer type printing apparatuses are known wherein a record sheet is superposed over a transfer ink film and dyes are transferred from the transfer ink film to the record sheet, thereby obtaining an image recorded sheet. In particular, heat-sensitive colored-image transfer type printing apparatuses utilizing sublimation type ink films ave recently attracted much attention because they can produce high-quality images, and have been developed for recording images, for example, in computer graphics.

However, conventional heat-sensitive image transfer type printing apparatuses have the problem that the transferred image is adversely affected to a small extent by extremely fine (dot-shaped) distortions and in particular the transferred colored image is degraded.

The inventors made extensive studies and experiments in order to find out the causes of distortion of the transferred images and have determined that the distortions are caused by extremely fine dust particles or the like attached to the record sheets. That is, when dust particles or the like are attached to the surface of a record sheet, they adversely affect the adhesion of dyes transferred to the record sheet, causing distortions in the transferred image. It therefore follows that the inventors believe that in order to improve the image quality, it is essential to remove all the dust particles or the like attached to a record sheet prior to the printing process.

Therefore, in order to prevent the attachment of dust particles or the like to the record sheets, the record sheet manufacturers strictly control the production of record sheets so that record sheets which are free from dust particles or the like and which are air-tightly sealed are delivered to the users. Even when the users receive such record sheets free from dust particles or the like, when a package containing record sheets is opened and the record sheets are loaded into a record-sheet feed cassette, the dust particles tend to attach to the surfaces of the record sheets. Furthermore, when the record sheets are loaded into the cassette, the fingerprints of the operator are left on the surfaces of the record sheets. Moreover, in general, the record-sheet feed cassettes have open top surfaces so that the dust particles tend to enter the cassette and attach to the surfaces of the record sheets.

SUMMARY OF THE INVENTION

The present invention was made on the basis of the above-described observed fact and has for its object to prevent the attachment of dust particles or the like to the surfaces of record sheets used in the heat-sensitive image transfer type printing apparatuses of the type where a record sheet is superposed on a transfer ink film and where the dyes are transferred to the record sheet by heating, thereby to obtain the image recorded sheet.

Another object of the present invention is to prevent the attachment of dust particles or the like to the surfaces of record sheets loaded in the feed cassette case which in turn is inserted into heat-sensitive image transfer type printing apparatus of the type described above.

In the heat-sensitive image transfer type printing apparatus in accordance with the present invention, even when dust particles or the like are attached to the surfaces of the record sheets supplied to a record-sheet feed part in the printing apparatus, the dust particles or the like attached to the surfaces of the record sheets are removed by dust removing means while each record sheet is fed to a recording position. Therefore, when a record sheet is superposed over a transfer ink film, no dust particle or the like exists at the interface between the record sheet and the transfer ink film so that the dyes are properly transferred to the record sheet and, consequently, a high-quality image can be obtained.

A record-sheet feed cassette- used in the heatsensitive image transfer type printing apparatus in accordance with the present invention has an air-tightly sealed cassette case which in turn has a record-sheet delivery opening which can be opened or closed.

The record sheet manufacturers produce the record sheets under the condition that no dust particles or the like are attached to the surfaces of the record sheets, load the record sheets free from the dust particles into cassette cases and seal the cassette cases when the record sheets are loaded. The sealed record-sheet loaded cassettes are then transported or stored. When the user uses a record-sheet cassette the user only opens the record-sheet delivery opening of the cassette and can set the cassette case into the printing apparatus. It therefore follows that the intrusion of dust particles into the record-sheet cassette and the attachment of fingerprints over the surfaces of the record sheet can be prevented.

DETAILED DESCRIPTION OF THE INVENTION

Now in order that the present invention may be more readily understood, some embodiments thereof will be described by way of example with reference to the accompanying drawings.

Figure 1:
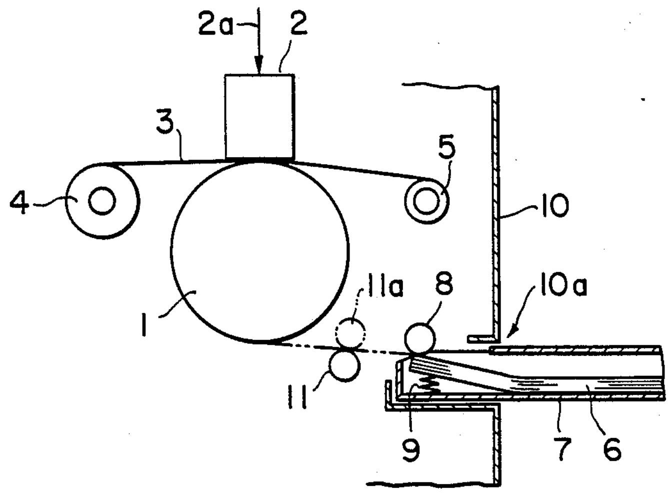
FIG. 1 is a schematic sectional view of a heat-sensitive image transfer type printing apparatus in accordance with the present invention.

FIG. 1 schematically illustrates the construction of a first preferred embodiment of a heat-sensitive colored-image transfer type printing apparatus in accordance with the present invention. The cylindrical peripheral surface of a drum 1 defines a record-sheet supporting surface around which is wrapped a record sheet 6. Disposed in opposing relationship with the supporting surface of the drum 1 is a conventional thermal head 2 which comprises a plurality of heating elements arranged in a straight array and which selectively energizes the heating elements in response to input image signal 2*a*. A sublimation type transfer ink film 3 has an array of yellow, magenta, cyan and black colors alternately arranged and is unwound from a feed reel 4, passes through the gap between the thermal head 2 and the supporting surface of the drum 1, and is taken up by a take-up reel 5. Multiple record sheets 6, each having an image receiving layer on one major surface thereof for receiving dyes transferred from the transfer ink film 3 in response to the input image signal 2*a*, are stacked and housed in a record-sheet cassette 7 which in turn is detachably mounted at a predetermined position in a record-sheet feed part 10*a* of a casing 10 of the main body of the printing apparatus. The record-sheet feed cassette 7 may be in the form of a tray with an open top, but it is preferable that it be so designed and constructed as air-tightly as possible that the attachment or adhesion of dust particles or the like over the surfaces of the record sheets 6 loaded in the cassette 7 is prevented. The feed part 10*a* is provided with a feed roller 8 for taking out record sheets 6 one at a time from the record-sheet feed cassette 7, and a bias spring 9 is loaded between the bottom of the feed cassette 7 and the bottommost record sheet 6 so that the stack of record sheets 6 is normally biased upwardly toward the feed roller 8.

An adhesive roller 11 which is means for removing the dust particles or the like attached on the image receiving layer of each record sheet 6 is disposed at one side of the record-sheet feed path extending from the record-sheet feed part 10*a* to the intersurface between the thermal head 2 and the supporting surface of the drum 1. The adhesive roller 11 may be a rubber roller which has a low degree of hardness and whose surface has a relatively low degree of adhesiveness. Such adhesive roller 11 may be fabricated by a method in which an adhesive having a low degree of adhesive strength is directly applied as coating over the cylindrical surface of a rubber roller, or by a method in which an adhesive tape whose both surfaces have a relatively low degree of adhesive strength is wrapped around the cylindrical surface of a rubber roller. The adhesive roller 11 is rotatably disposed at the position shown in FIG. 1 in such a way that it can be made into contact with the image receiving layer of each record sheet 6 being fed from the feed part 10*a* and, furthermore, it may be readily removed for replacement or the like.

Next, the mode of operation of the heat-sensitive colored-image transfer type printing apparatus with the above-described construction will be described. When the feed cassette 7 in which many record sheets 6 are stacked is set at the record-sheet feed part 10*a* shown in FIG. 1, the feed roller 8 is driven in rotation so that the uppermost record sheet 6 is taken out of the feed cassette 7, fed to the supporting surface of the drum 1 and wrapped around the drum 1. When the record sheet 6 is fed from the record-sheet feed part 10*a* to the drum 1, the image receiving layer of the record sheet 6 is made into sliding contact with the adhesive roller 11. Since the cylindrical surface of the adhesive roller 11 has a relatively low degree of adhesive strength, it can remove the dust particles or the like attached to the image receiving layer of the record sheet 6 without adversely affecting the smooth feed of the record sheet 6. Therefore the record sheet 6; that is, the image receiving layer thereof, wrapped around the cylindrical surface of the drum 1 is completely free from dust particles or the like. Thereafter, according to the conventional heat-sensitive colored-image transfer type printing method, a colored image is recorded on the record sheet wrapped around the drum 1 in response to the image signal fed to the thermal head 2. During such image transfer process, no dust particles or the like exist between the transfer ink film 3 and the record sheet 6 so that the dyes from the transfer ink film 3 are positively transferred into the image receiving layer of the record sheet 6 and consequently a high-quality, distortion-free image can be recorded.

When the colored image is recorded on the record sheet 6 in the manner described above, the record sheet 6 is removed from the drum 1 and the next record sheet 6 is taken out of the record-sheet feed cassette 7 and wrapped around the drum 1 so that a colored image is recorded on the record sheet 6 in a manner substantially similar to that described above. The same procedure is repeated to record colored images on the record sheets 6. When the cylindrical surface of the adhesive roller 11 is contaminated or becomes incapable of removing the dust particles or the like from the record sheets 6 during the continuation of the printing or recording operation, the adhesive roller 11 is removed and replaced by a new adhesive roller, or the adhesive layer over the cylindrical surface of the adhesive roller 11 is refreshed.

Figure 2:
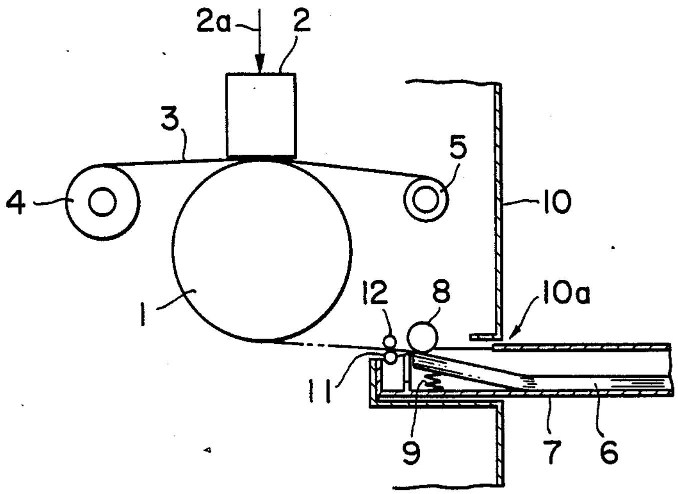
FIG. 2 is a schematic sectional view of another embodiment of the present invention.

In the first embodiment, the adhesive roller 11 has been described as a rotatable roller, but it is to be understood that the adhesive roller 11 may be forcibly rotated in synchronism with the record-sheet feed speed. Furthermore, in order to ensure the positive contact between the record sheet 6 and the adhesive roller 11, a pressure roller 11*a* may be provided so as to press against the adhesive roller 11. In addition, the position of the adhesive roller 11 is not limited to the position shown in FIG. 1 and may be changed as need demands. For instance, as shown in FIG. 2, the adhesive roller 11 can be rotatably disposed at the leading side of the record-sheet feed cassette 7 and the pressure rollers 12 can be disposed on the side of the main body of the printing apparatus in opposing relationship with the adhesive roller 11.

In the first and second embodiments described above, the adhesive roller 11 is used as dust removal means, but it is to be understood that the present invention is not limited only to such adhesive roller and that various modifications can be utilized as will be described hereinafter.

Figure 3:
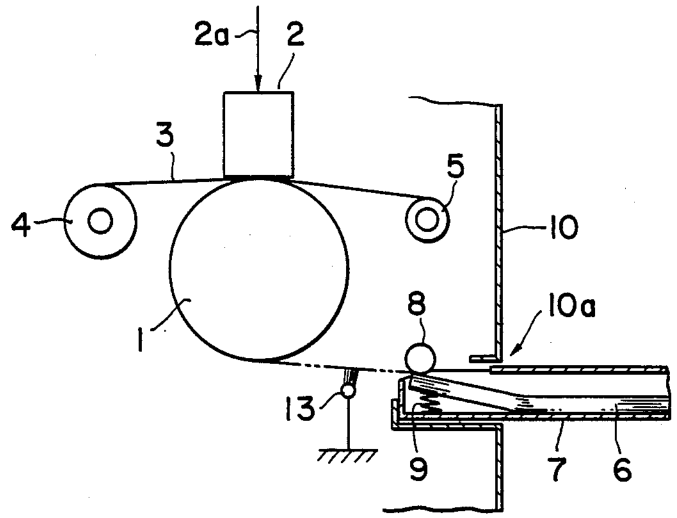
FIG. 3 is a schematic sectional view of a further embodiment of the present invention.

Referring now to FIG. 3, a discharge brush 13 with soft and electrically conductive fibers is disposed as dust removable means along the record-sheet feed path and is grounded so that static electricity of the record sheet is removed, whereby the dust particles or the like are removed. Removal of static electricity from the record sheet is advantageous not only in that the dust particles or the like attached to the record sheets can be removed but also in that after the printing, the attachment or adhesion of dust particles or the like to the printed surfaces of the record sheets can be prevented.

Figure 4:
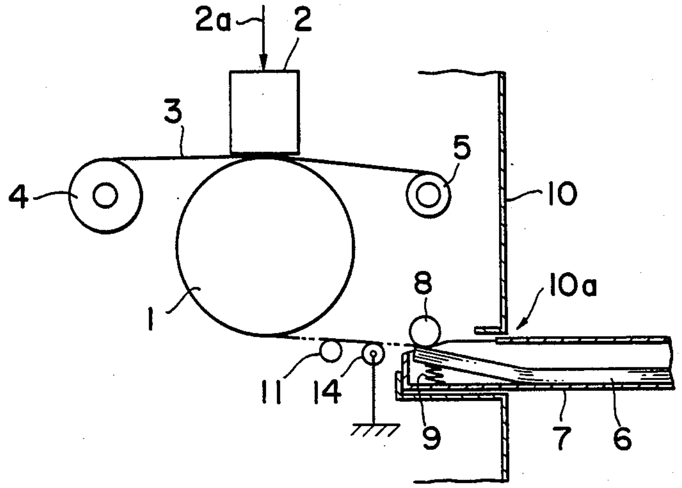
FIG. 4 is a schematic sectional view of yet another embodiment of the present invention.

FIG. 4 illustrates yet another embodiment of the present invention in which a grounded metal roller 14 and an adhesive roller 11 are disposed along the record-sheet feed path. The metal roller 14 discharges static electricity from the record sheet 6 while the adhesive roller 11 can remove the remaining dust particles or the like.

As described above, in the case of heat-sensitive image transfer type printing apparatus, even when the dust particles or the like are attached to the surfaces of the record sheets loaded in the record-sheet feed part 10*a*, they can be completely removed therefrom while the record sheet is being fed from the feed part 10*a* to the recording position so that no dust particle or the like exists between the transfer ink film and the record sheet during the image recording step and consequently the dyes from the transfer ink film are positively transferred to the record sheet, whereby a high-quality image can be obtained.

Figure 5:
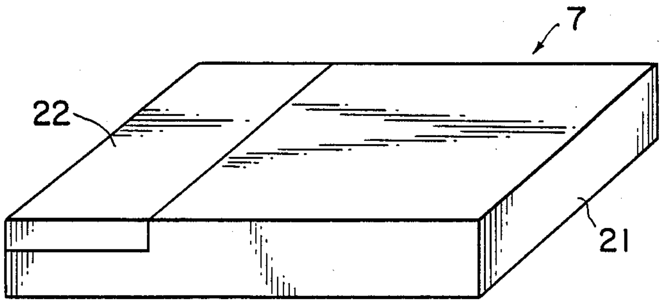
FIG. 5 is a schematic perspective view of a record-sheet cassette adapted to be used in a heat-sensitive image transfer type printing apparatus in accordance with the present invention.
Figure 6:
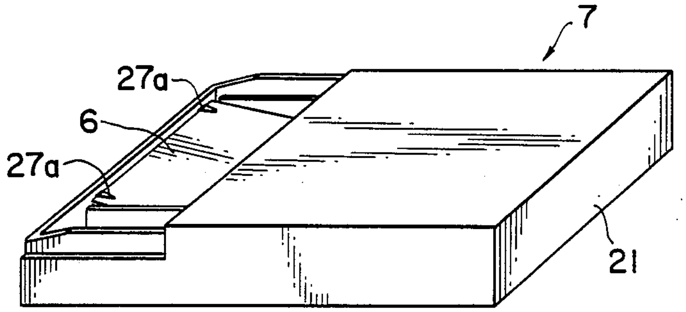
FIG. 6 is a schematic perspective view illustrating the cassette with its record-sheet delivery opening being opened.
Figure 7:
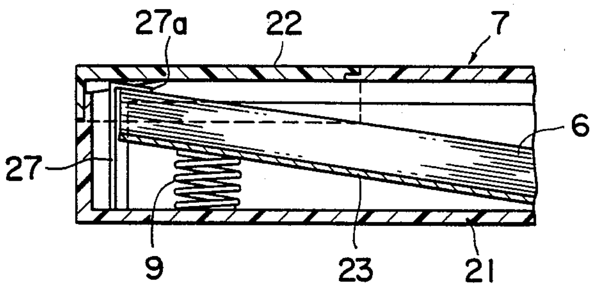
FIG. 7 is a sectional view of the major portion of the record-sheet cassette shown in FIG. 5.

FIGS. 5 through 7 illustrate another embodiment of a record-sheet feed cassette best adapted for use with the heat-sensitive image transfer type printing apparatuses described above with reference to FIGS. 1 through 4.

As best shown in FIG. 5, a record-sheet feed cassette 7 has a cassette case 21 and a cover 22 which is attached to the record-sheet feed portion at the front part of the cassette case 21 in such a way that the cover 22 may be opened or closed. As shown in FIGS. 6 and 7, the case 21 has many record sheets 6 stacked therein, a swingable supporting plate 23 for supporting the leading edges of the record sheets 6, a bias spring 9 for normally biasing the supporting plate 23 upwardly and an engaging unit 27 having engaging pawls 27*a* which control the heights of both ends of the leading edge of the uppermost record sheet 6. The cassette case 21 is so designed and constructed as to be detachably mounted in the record-sheet feed part 10*a* (See FIG. 1) of the printing apparatus and may be provided with guide pins, guide grooves or the like (not shown) in order to facilitate the insertion of the cassette case 21 into the printing apparatus, if necessary. Except for the record-sheet delivery opening, the cassette case 21 is designed and constructed to be air-tight so that when the cover 22 closes the record-sheet delivery opening, the intrusion of the dust particles or the like from the exterior into the case 21 can be completely prevented.

Next, the mode of use of the record-sheet feed cassette 7 with the above-described construction will be described. The record sheets 6 are manufactured in the factories in such a way that no dust particles or the like adhere to the surfaces of the record sheets and a predetermined number of stacked record sheets 6 are loaded into the cassette cases 21. The cassette cases 21 each with its record-sheet delivery opening closed with the cover 22 are delivered to the users. In this case, in order to prevent dust particles or the like from intruding into the case 21 through the joints between the cover 22 and the case 21, a suitable adhesive tape may be used to seal the joints, or the whole feed cassette may be packed with a suitable packing sheet or film. In either case, the record sheets are loaded into the cassette cases and stored or transported in such a way that the record sheets are air-tightly sealed to avoid the attachment of dust particles or the like to the surfaces thereof.

The user removes the cover 22 of the record-sheet feed cassette 21 to open the record-sheet delivery opening and sets the cassette 21 into the record-sheet feed part 10a shown in FIG. 1 without touching any of the record sheets 6 in the cassette 21. Under these conditions, the feed roller 8 takes out record sheets 6 one at a time from the record-sheet feed cassette 7 and wraps it around the cylindrical outer surface of the drum 1. Prior to this operation, the adhesive roller 11 is brought into contact with the image receiving layer of the record sheet 6 being transported to the drum to completely remove the dust particles or the like if they should be attached to the record sheet 6.

As described above, when the record-sheet feed cassette with the above-described construction is used, the record sheets stored therein are sequentially fed to the drum 1 under completely dust free condition. Furthermore, during the recording or printing operation, direct touching or contact of the record sheet by the operator can be avoided so that no fingerprints are left over the image receiving layer of the record sheet. Moreover, even when the record-sheet feed cassette is mounted into the record-sheet feed part of the printing apparatus, it is completely air-tightly sealed from the surrounding atmosphere. As a result, the intrusion of dust particles or the like from the exterior into the record-sheet feed cassette can be prevented, and consequently a high-quality and distortion-free image can be obtained.

Figure 8:
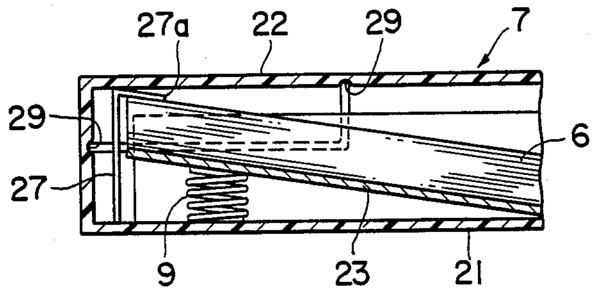
FIG. 8 is a sectional view illustrating the major portion of another embodiment of a record-sheet cassette.
Figure 9:
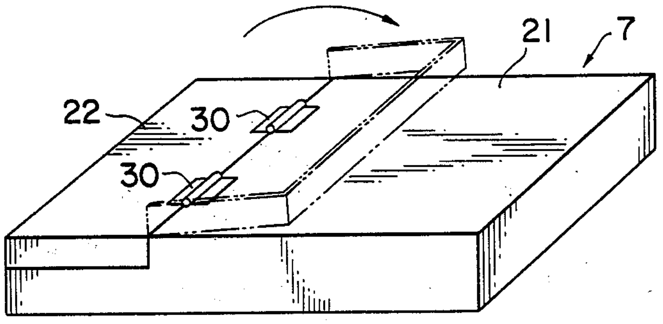
FIG. 9 is a schematic perspective view of a further embodiment of a cassette.
Figure 10:
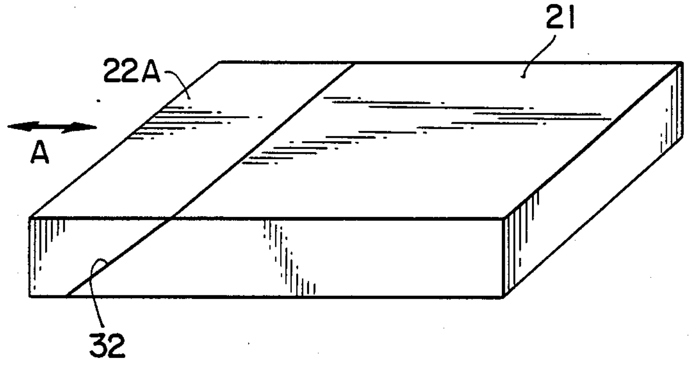
FIG. 10 is a schematic perspective view of yet another embodiment of a cassette.
Figure 11:
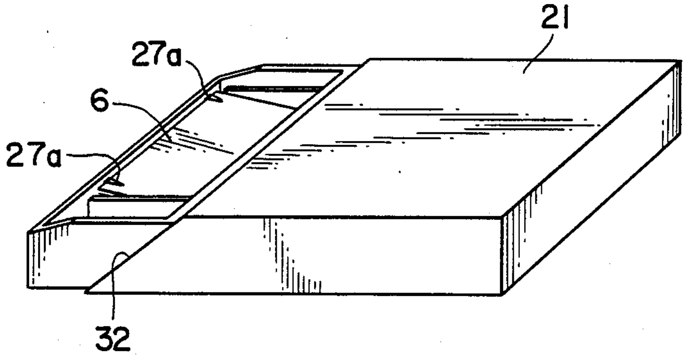
FIG. 11 is a schematic perspective view of the cassette shown in FIG. 10 with its record-sheet delivery opening being opened.
Figure 12:
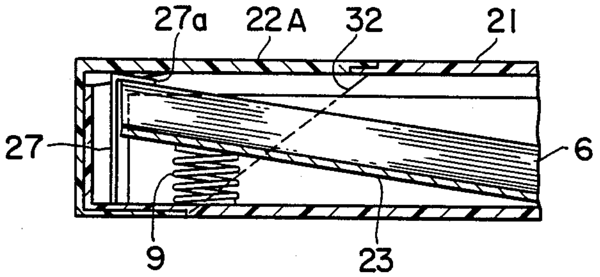
FIG. 12 is a sectional view of the major portion of the cassette shown in FIG. 10.

In the case of the cassette case 21 described above with reference to FIGS. 5 through 7, the detachable cover 22 is used, but as best shown in FIG. 8 the cover 22 may be formed integral with the cassette case 21 in such a way that the cover 22 can be removed along a weakened tear-off line 29. Alternatively, as best shown in FIG. 9, the cover 22 may be joined to the cassette case 21 with hinges 30 in such a way that the cover 22 may be opened or closed. In addition, the shape of the cover 22 can be modified in various ways. For instance, as shown in FIGS. 10 through 12, a sliding cover 22A which can be inserted into or withdrawn out of the cassette case 21 in the directions indicated by the double-point arrow may be used. When the cover 22A is inserted into the case 21, the side surfaces of the cover 22A are brought into contact with the inclined abutting walls 32 of the cassette 21.

So far all of the record-sheet feed cassettes have been provided each with the bias spring 9 normally biasing the record sheets upwardly and the pawls 27*a* for controlling the height of the uppermost record sheet 6, but it is to be understood that the present invention is not limited to the record-sheet feed cassettes of the types described above and that various modifications can be effected. For instance, it is apparent that a portion of the bottom plate of the record-sheet feed cassette is so designed and constructed that it can swing upwardly by a bias spring mounted on the recording apparatus.

Each of the record-sheet feed cassettes described above has an air-tight cassette case into which are loaded the record sheets and for which the record-sheet delivery opening can be opend. As a result, the record sheets can be stored or transported in such a way that no dust particles or the like attach the surfaces of the record sheets stacked in the cassette case. Furthermore, the record-sheet feed cassette can be set at a predetermined position of the recording or printing apparatus without touching the record sheets loaded in the cassette. Thus, the attachment of dust particles or the like and fingerprints over the image receiving layers of the record sheets can be completely prevented so that high-quality images can be obtained.

What is claimed is:

1. A heat-sensitive image transfer type printing apparatus comprising:

record-sheet supporting means having a supporting surface upon which is supported a record sheet;

a thermal head disposed in opposing relationship with said supporting surface of said record-sheet support means and having a plurality of heating elements which are selectively energized in response to an input image signal;

transfer-ink-film feed means for feeding a transfer ink film, having at least one major surface containing dyes, between said supporting surface of said record-sheet supporting means and said thermal head;

record-sheet feed means for feeding a record sheet from a record-sheet feed part between said supporting surface of said record-sheet supporting means and said thermal head in such a way that the fed record sheet is superposed on said ink transfer film, whereby the dyes are transferred to and recorded in the image receiving layer of said superposed record sheet by the selective energization of said plurality of heating elements of said thermal head; and a record-sheet feed cassette in which is contained a stack of a plurality of record sheets and which is detachably inserted into said record-sheet feed part and has an air-tightly sealed cassette case which in turn is provided with a record-sheet delivery unit which can be opened.

2. A heat-sensitive image transfer type printing apparatus as set forth in claim 1, wherein said record-sheet delivery unit which can be opened is provided at one side of said cassette case.

3. A heat-sensitive image transfer type printing apparatus as set forth in claim 1, wherein said record-sheet delivery unit comprises a detachable cover.

4. A heat-sensitive image transfer type printing apparatus as set forth in claim 1, wherein said record-sheet delivery unit comprises a cover which can be torn off.

5. A heat-sensitive image transfer type printing apparatus as set forth in claim 1, wherein said record-sheet delivery unit comprises a cover which can be rotatably closed or opened.

6. A heat-sensitive image transfer type printing apparatus as set forth in claim 2, wherein an adhesive roller is rotatably disposed at said one side of said cassette case.

7. A heat-sensitive image transfer type printing apparatus comprising:

record-sheet supporting means having a supporting surface upon which a record sheet is supported;

a thermal head disposed in opposing relationship with said supporting surface of said record-sheet supporting means with a gap therebetween and having a plurality of heating elements which can be selectively energized in response to an input image signal;

transfer-ink-film transportation means for transporting a transfer ink film, having at least one major surface containing dyes, between said supporting surface of said record-sheet supporting means and said thermal head; and record-sheet feed means for feeding a record sheet from a record-sheet feed part to said gap such that said transported record sheet is superposed on said transfer ink film, whereby the dyes are transferred from said transfer ink film to said superposed record sheet by selective energization of said plurality of heating elements of said thermal head and said transfer dyes are recorded on said superposed record sheet;

wherein said record-sheet feed means comprises dust removal means disposed at a position in the record-sheet feed path extending from said record-sheet feed part to said gap so as to remove dust particles or the like attached to the surface of the record-sheet being transported, wherein said dust removal means comprises a grounded electric discharge brush in contact with the image receiving layer of the record-sheet being transported.

8. A heat-sensitive image transfer type printing apparatus comprising:

record-sheet supporting means having a supporting surface upon which a record sheet is supported;

a thermal head disposed in opposing relationship with said supporting surface of said record-sheet supporting means with a gap therebetween and having a plurality of heating elements which can be selectively energized in response to an input image signal;

transfer-ink-film transportation means for transporting a transfer ink film, having at least one major surface containing dyes, between said supporting surface of said record-sheet supporting means and said thermal head; and record-sheet feed means for feeding a record sheet from a record-sheet feed part to said gap such that said transported record sheet is superposed on said transfer ink film, whereby the dyes are transferred from said transfer ink film to said superposed record sheet by selective energization of said plurality of heating elements of said thermal head and said transfer dyes are recorded on said superposed record sheet;

wherein said record-sheet feed means comprises dust removal means disposed at a position in the record-sheet feed path extending from said record-sheet feed part to said gap so as to remove dust particles or the like attached to the surface of the record-sheet being transported, wherein said dust removal means comprises a grounded metal roller and an adhesive roller, both of which contact the image receiving layer of the record sheet being transported.

* * * * *